Feb. 9, 1960

C. R. DOUGLASS 2,924,460

SOUND EFFECTS APPARATUS

Filed May 17, 1954

INVENTOR.
CHARLES R. DOUGLASS
BY
Lyon & Lyon
ATTORNEYS

Feb. 9, 1960  C. R. DOUGLASS  2,924,460
SOUND EFFECTS APPARATUS
Filed May 17, 1954  2 Sheets-Sheet 2
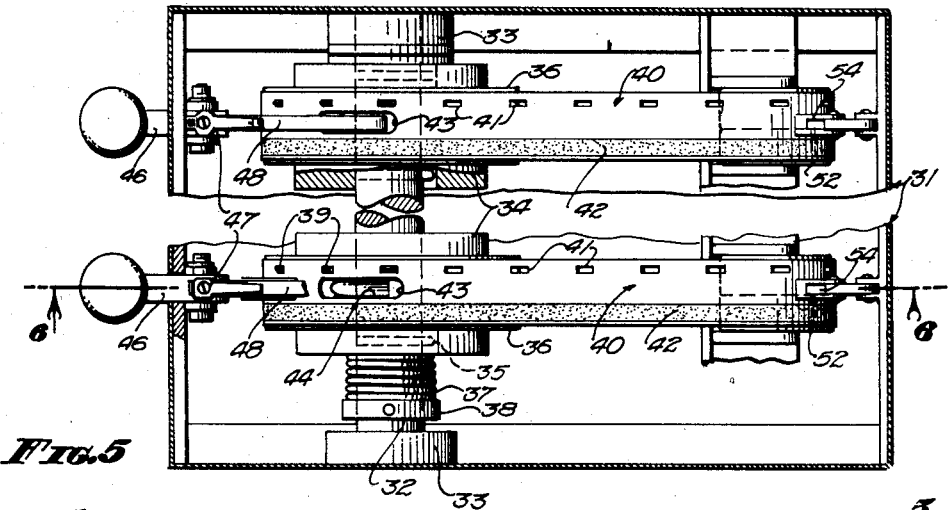
FIG. 5
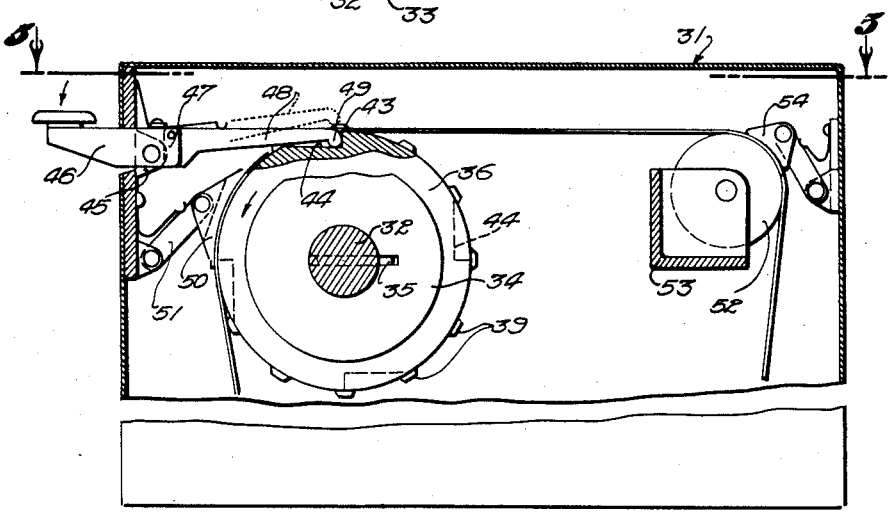
FIG. 6
INVENTOR.
CHARLES R. DOUGLASS
BY
ATTORNEYS United States Patent Office 2,924,460
Patented Feb. 9, 1960

2,924,460
SOUND EFFECTS APPARATUS
Charles R. Douglass, Woodland Hills, Calif.
Application May 17, 1954, Serial No. 430,079
11 Claims. (Cl. 274—18)

My invention relates to sound effects apparatus, and included in the objects of my invention are:

First, to provide a sound effects apparatus wherein a series of sounds are recorded on endless sound tracks and means are provided for selectively starting said sound tracks and for automatically stopping said sound tracks at accurately predetermined points ready for repetition of the sound effect when desired.

Second, to provide a sound effects apparatus which is particularly useful in producing simultaneously a plurality of related sounds; for example, the sound of laughter, ranging from the chuckle of an individual to the prolonged hearty laughter of a group, such as an audience.

Third, to provide a sound effect apparatus which is particularly useful in dubbing sound effects into a transcription, moving picture, or kinescope recording; for example, laughter to the extent and degree appropriate for the occasion, by utilizing simultaneously or in sequence the sounds from one or several tracks.

Fourth, to provide a sound effects apparatus which is easily manipulated and brought into full operation without noticeable lag, so that the sound effect may occur accurately on cue, and which is equally applicable to the dubbing in of sound effects simultaneously with recording of the acting, or dubbed in during later culling and editing of the recording.

With the above and other objects in view, as may appear hereinafter, reference is directed to the accompanying drawings, in which:

Fig. 5 is a fragmentary, partial plan, partial sectional view, taken substantially from the line 5—5 of Fig. 6, showing another modified form of my sound effects apparatus; and Fig. 6 is a partial sectional, partial elevational view thereof, taken substantially along the line 6—6 of Fig. 5.

Figure 1:
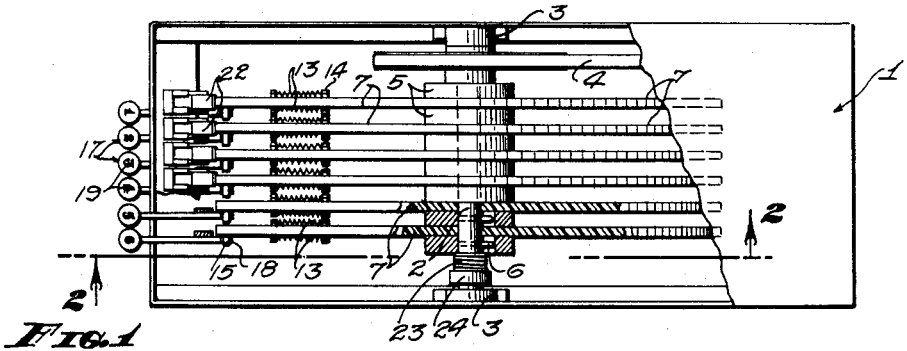
Figure 1 is a partial plan, partial sectional view of one form of my sound effects apparatus.
Figure 2:
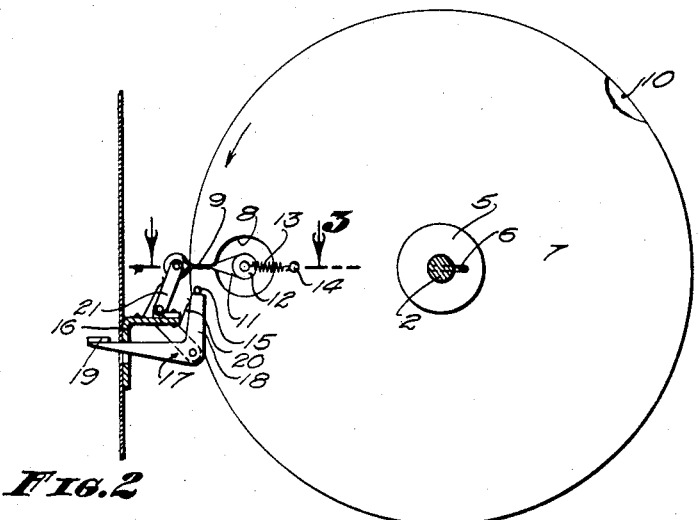
Fig. 2 is a sectional view thereof through 2—2 of Fig. 1.
Figure 3:
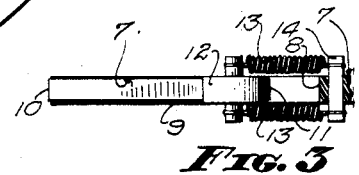
Fig. 3 is a fragmentary sectional view through 3—3 of Fig. 1.

Reference is first directed to Figs. 1 through 3. In the construction here illustrated there is provided a housing or casing 1 of rectangular form in which is mounted a drive shaft 2 supported at its extremities on bearings 3. A suitable drive means 4, which may include a belt and pulley, shown fragmentarily in Fig. 1, rotates the drive shaft 2 at a predetermined speed.

Mounted on the drive shaft 2 is a series of drive discs 5, each having a key slot which receives a drive pin 6 extending radially from the drive shaft. The axial ends of the drive discs 5 are flat and parallel. Fitted between the drive discs is a series of plates 7. The plates 7 are relatively large in diameter and have flat parallel sides.

Figure 4:
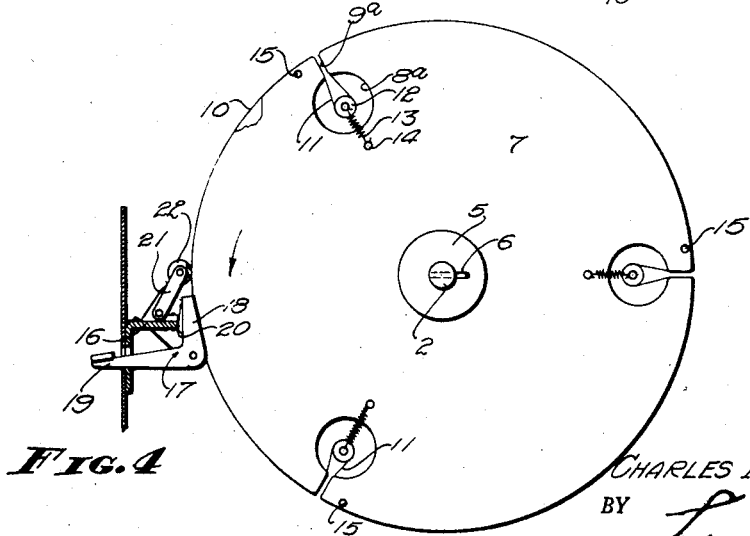
Fig. 4 is a sectional view similar to Fig. 2, showing a modified form of the supporting plate for the sound track.

In the construction shown in Fig. 1 six such plates 7 are shown. Each plate 7 is provided near its periphery with a single aperture 8, such as shown in Fig. 2, or several apertures 8a as shown in Fig. 4. Radial slits 9 and 9a, respectively, connect the apertures 8 and 8a with the periphery of the corresponding plate 7.

The periphery or edge of each plate 7 is smooth and parallel with the axis of the plate so that the plate forms a thin cylindrical drum around which is wrapped an endless sound tape 10. The sound tape is as sufficiently greater than the circumference of the plate as to form a loop 11, which extends through the slit 9 or 9a into the aperture 8 or 8a. Fitted in the loop 11 is a tension disc 12 having axial stems to which are attached tension springs 13 extending radially on each side of the plate 7 and anchored to ends of a pin 14, as shown best in Fig. 3. By this arrangement the sound tape 10 is retained in a snug condition on the periphery of the plate 7, even though the tape may stretch or shrink slightly.

Adjacent each slit 9 or 9a, and adjacent the periphery of each plate 7, is an axially directed stop pin 15. Suitably supported from a bracket 16 at one end of the housing 1 is a row of levers 17. Each lever includes an upstanding stop arm 18 so positioned as to engage the stop pin 15, as shown in Fig. 2. Each lever 17 also includes an operating arm 19 which projects through the adjacent wall of the housing 1 for manual engagement so as to move the stop arm 18 clear of the corresponding stop pin 15. A spring 20 normally maintains each lever 17 in position to engage its corresponding stop pin 15.

Supported on the bracket 16 by yieldable link means 21 is a row of sound pickup heads 22 arranged to ride lightly on the sound tapes 10. The pickup heads 22 are so located relative to the stop arms 18 of the levers 17 that they occupy positions opposite or just beyond a slit 9 or 9a when the corresponding operating arm engages its stop pin 15.

A spring 23 backed by a collar 24 exerts an axial pressure on the plates 7 and drive discs 5 to maintain sufficient pressure to ensure dependable frictional drive connections to the plates 7.

One of the applications of my sound effects apparatus is to "dub" in the sound of laughter in a radio or television program, either the live program or the record or transcription thereof. To accomplish this a series of laugh effects are recorded on the series of tapes. These may be actual recordings of laughter of individuals or a group, and may vary in duration. The shorter laugh sequences are impressed on tapes wrapped on plates having two or more apertures. Normally, all of the plates with their sound tape recordings are stationary, by reason of the engagement of their stop pins 15 with the corresponding operating arms 19.

The drive shaft 2 and drive discs 5 rotate continuously. The spring 23 maintains sufficient frictional engagement between the drive discs 5 and plates 7 to ensure almost instantaneous starting of each plate 7 and its sound tape 10 when the corresponding stop pin 15 is released by depression of the corresponding operating arm 19. Thus, it can be seen that one, two, or all six of the plates 7 may be released for rotation simultaneously so that the effect may vary from a slight chuckle to uproarious laughter. After the operating arms 19 of the levers 17 are momentarily engaged and then released, the series of plates 7 and their sound tapes 10 rotate either a complete revolution, as represented by Fig. 2, or a partial revolution, as represented by Fig. 4.

Although a laugh effect has been selected, by way of example, the sounds impressed on the various tapes may be any sound that it is desired to employ; for example, it may be other related sounds, such as the firing of guns at various distances, the roar of automobiles, etc. It is not necessary, of course, that the sound on each of the tapes be related to each other, or that the sounds be merely noises of one kind or another. The sounds may be fragments of musical compositions as well.

Reference is now directed to Figs. 5 and 6 which provide means for recording sounds having a longer duration than is possible with the plates 7 without unduly enlarging the entire machine. In this construction a housing 31 is provided having a transverse drive shaft 32, mounted on bearings 33, and turned at a uniform speed by suitable drive means, not shown.

As in the first described structure, the drive shaft 32 is provided with drive discs 34 mechanically connected to the drive shaft by drive pins 35. Interposed between the drive discs 34 are a plurality of drums 36. A spring 37 backed by an adjustable collar 38 ensures proper frictional contact between the drive discs 34 and the drums 36, so that the drums tend to rotate at exactly the same speed as the drive discs.

Each drum is provided with sprocket teeth 39. A sound tape 40 extends over each drum. The sound tape is provided with sprocket slots 41 to engage the teeth 39. The sprocket slots are arranged along one margin of the tape. One or more sound tracks 42 are arranged along the opposite margin of the tape. Between the sprocket slots 41 and the sound track 42 each tape is provided with one or more apertures 43. The aperture or apertures are so disposed that they register with one or more notches 44 provided in the drums 36.

One end wall of the housing 31 is provided with a series of brackets 45 confronting the row of drums 36. Each bracket supports an operating arm 46 which extends outwardly through the wall of the housing 31 for manual engagement. Secured to each operating arm 46 within the housing by a pivotal connection 47 is a stop arm 48, which is provided with a rounded end 49 adapted to ride on the tape 40 in alignment with the aperture or apertures 43 so that when such aperture coincides with a notch 44 in the drum 36 the stop arm 48 may engage the notch 44 to restrain the drum against rotation, as shown in Fig. 6.

In order to ensure proper engagement between the tape 40 and the sprocket teeth 41, each drum 36 may be provided with a shoe 50 which is supported by a suitable link means 51 and bears yieldably against the tape as it passes around the drum. The tapes 40 are endless tapes, and after passing their respective drums fold back and forth at the bottom of the housing.

Located rearwardly of each drum 36 is a sound pickup head 52 which is conventional in construction. One type of conventional sound pickup head is essentially cylindrical in form, or at least forms a segment of a cylinder in the region of its pickup magnets. Each sound tape 40 passes around a corresponding sound head 52 and if necessary, for full support, a dummy cylindrical member adjacent thereto. The sound heads 52 may be supported from a common bracket 53 extending across the housing 31 parallel to the drive shaft 32. Shoes 54 may be provided to yieldably engage the tape 40 and hold it in proper contact with the sound pickup head 52 as the tape passes thereover.

Operation of the modification shown in Figs. 5 and 6 is as follows:

The starting point of each sound effect is impressed on the sound tape 40 a predetermined distance from an aperture 43 therein, so that the starting point of the sound is in registry or about to move into registry with the corresponding sound head. Upon depression of an operating arm 46, the corresponding stop arm 48 is raised, permitting the corresponding sound tape 40 to be driven by its drum 36. The sound tape comes up to full speed almost instantaneously, and the sound is picked up by the sound head until an aperture 43 coincides with a slot or notch 44 to permit the stop arm 48 to restrain the drum 36.

As in the first described structure, a series of sound tapes are employed with various related or non-related sounds of different lengths. If the sound is of short duration, then a series of apertures 43 are provided, whereas if the sound is of longer duration less apertures are employed. Thus, the sound may be any length less than the length of the endless sound tape.

Having fully described my invention, it is to be understood that I do not wish to be limited to the details herein set forth but my invention is of the full scope of the appended claims.

I claim:

1. A sound effects apparatus, comprising: an endless tape having a sound track on which is impressed at least one sound sequence beginning at a predetermined point on said sound tape said sound track being so arranged as to repeat with each cycle of said endless tape, said tape having a sound free section in the region preceding said beginning point; a pickup unit disposed in cooperating relation with said sound track; a drive means tending to advance said sound track continuously past said pickup unit and tending to cause said sound track to repeatedly pass said pickup unit; means for restraining said drive means including a stop located in predetermined relation to the beginning of said sound sequence, and a control member normally engageable with said stop to restrain said endless tape and movable to release said stop to permit a single cycle of said endless tape before reengagement with said stop.

2. A sound effects apparatus as set forth in claim 1, wherein: said drive means includes a plate member, said endless tape is wrapped about the edge thereof, and said stop protrudes axially from said plate.

3. A sound effects apparatus as set forth in claim 1, wherein: said drive means includes a sprocket drum, said endless tape is perforated for engagement therewith, and said stop includes a recess in the periphery of said drum and a mating aperture in said tape.

4. A sound effects apparatus, comprising: a drive shaft adapted for continuous rotation at a predetermined speed; a series of drums and friction drive elements mounted thereon, said friction drive elements tending to rotate said drums continuously; control means for each drum including a stop on the drum and a control member movable to and from engagement with said stop to restrain said drum against rotation and to release said drum for rotation respectively, whereby selected members of said series of drums may be caused to rotate; an endless tape for each drum, each tape including a sound track having a sound sequence impressed thereon at a predetermined beginning point, said sound track being so arranged as to repeat with each cycle of said endless tape, said tape having a sound free section in the region preceding said beginning point; and a sound pickup head for each sound track located in predetermined relation to the stop of the corresponding drum, whereby, when said drum is restrained the beginning point of the sound sequence occupies a selected spatial relation to said pickup head.

5. A sound effects apparatus as set forth in claim 4, wherein: each of said drums is in the form of a thin plate, said endless tape is wrapped about the periphery thereof, and said stop protrudes axially from said plate.

6. A sound effects apparatus as set forth in claim 4, wherein: each of said drums is provided with sprocket teeth, said endless tape is provided with perforations mating said teeth, and each stop includes a notch in the corresponding drum underlying said tape, said tape is provided with an aperture adapted to register with said notch, and said control member is adapted to ride on said tape until said notch is exposed through said aperture.

7. A sound effects apparatus, comprising: a housing; a drive shaft mounted therein and adapted for continuous rotation at a predetermined speed; a series of axially slidable drive discs mounted on said shaft to rotate therewith; a series of drums journaled on said shaft between said discs; yieldable means causing said discs to frictionally contact said drums to rotate said drums with said shaft, each of said drums being independently restrainable; control means for each drum including a stop on the drum and a control member movable to and from engagement with said stop to restrain said drum against rotation and to release said drum for rotation respectively, whereby selected members of said series of drums may be caused to rotate; an endless tape for each drum, each tape including a sound track having a sound sequence impressed thereon at a predetermined beginning point, said sound track being so arranged as to repeat with each cycle of said endless tape, said tape having a sound free section in the region preceding said beginning point; and a sound pickup head for each sound track located in predetermined relation to the stop of the corresponding drum, whereby when said drum is restrained the beginning point of the sound sequence occupies a selected spatial relation to said pickup head.

8. A sound effects apparatus as set forth in claim 7, wherein: each of said drums is in the form of a thin plate, said endless tape is wrapped about the periphery thereof, and said stop protrudes axially from said plate.

9. A sound effects apparatus as set forth in claim 7, wherein: each of said drums is provided with sprocket teeth, said endless tape is provided with perforations mating said teeth, and each stop includes a notch in the corresponding drum underlying said tape, said tape is provided with an aperture adapted to register with said notch, and said control member is adapted to ride on said tape until said notch is exposed through said aperture.

10. A sound effects apparatus, comprising: a plurality of endless sound tapes, each having at least one sound sequence impressed thereon and a sound free region preceding said sound sequence; a sound pickup head for each tape; means tending to advance said tapes continuously past said sound pickup heads whereby each of said sound sequences tend to repeat; means for restraining each tape in a position with the starting end of its sound sequence in predetermined proximity to the corresponding pickup head; and control means connected with each restraining means for independently releasing said tapes.

11. A sound effects apparatus, comprising: a disc member having a slit in its periphery and an aperture communicating with said slit inwardly of said periphery; an endless tape wrapped about the periphery of said disc member including a loop extending through said slit into said aperture; yieldable means arranged to apply tension to said loop and through said loop to the remainder of said endless tape to retain said tape on the periphery of said disc; means tending to rotate said disc continuously; a sound track on said tape beginning beyond one side of said slit and terminating short of the other side thereof; a sound pickup unit positioned for cooperation with said sound track; a stop on said disc; and means engageable with said stop to restrain movement of said disc with the beginning end of said sound track in predetermined relation with said pickup unit, said means being movable to release said stop thereby to permit rotation of said disc until said stop is reengaged.

References Cited in the file of this patent

UNITED STATES PATENTS

| | | |
|---|---|---|
| 852,352 | Sheldon | Apr. 30, 1907 |
| 967,079 | Stipe | Aug. 9, 1910 |
| 1,988,361 | Pearson | Jan. 15, 1935 |
| 2,043,884 | Crudo | June 9, 1936 |
| 2,468,224 | Munson | Apr. 26, 1949 |
| 2,517,102 | Flory | Aug. 1, 1950 |
| 2,519,725 | White | Aug. 22, 1950 |
| 2,549,145 | Vagtborg | Apr. 17, 1951 |
| 2,551,198 | Barrett | May 1, 1951 |
| 2,690,913 | Rabinow | Oct. 5, 1954 |

FOREIGN PATENTS

| | | |
|---|---|---|
| 134,018 | Great Britain | May 16, 1919 |